United States Patent [19]

Aschauer

[11] Patent Number: 5,068,092
[45] Date of Patent: Nov. 26, 1991

[54] CRYSTALLIZER, PROCESS AND APPARATUS FOR PRODUCING SODIUM CHLORIDE CRYSTALS

[75] Inventor: Martin N. Aschauer, Port Huron, Mich.

[73] Assignee: Akzo N.V., Netherlands

[21] Appl. No.: 526,209

[22] Filed: May 21, 1990

[51] Int. Cl.⁵ ............................................. C01D 3/06
[52] U.S. Cl. ................................... 422/253; 422/245; 423/497; 23/302 R; 23/302 T
[58] Field of Search ............. 422/245, 253; 23/302 R, 23/302 S, 302 T

[56] References Cited

U.S. PATENT DOCUMENTS

| | | | |
|---|---|---|---|
| 2,702,121 | 1/1950 | Colin et al. | 23/295 S |
| 2,968,525 | 6/1958 | Clark et al. | 23/295 S |
| 3,071,450 | 4/1960 | Martin | 23/310 |
| 3,130,016 | 5/1961 | Grier | 23/312 |
| 3,772,202 | 11/1973 | Neitzel et al. | 225/70 |
| 3,832,143 | 8/1974 | Neitzel | 23/296 |
| 3,833,504 | 9/1974 | Neitzel et al. | 252/70 |
| 3,852,044 | 12/1974 | Neitzel et al. | 23/298 |
| 3,895,920 | 7/1975 | Garrett | 23/298 |
| 4,119,556 | 10/1978 | Chubb | 252/70 |
| 4,140,747 | 1/1979 | Sadan | 423/163 |
| 4,334,885 | 6/1982 | Harrison et al. | 23/300 |
| 4,341,752 | 7/1982 | Groenhof | 23/304 |
| 4,386,936 | 6/1983 | Geesen | 23/295 S |
| 4,504,092 | 3/1982 | Bichara et al. | 423/178 |
| 4,564,367 | 1/1986 | Heiss et al. | 23/295 S |
| 4,569,676 | 2/1986 | Swinkels et al. | 23/295 S |

OTHER PUBLICATIONS

Kaufmann, Dale W., *Sodium Chloride: The Production and Properties of Salt and Brine*, 1971, pp. 15–21.

Primary Examiner—Robert Kunemund
Assistant Examiner—Felisa Garrett
Attorney, Agent, or Firm—Louis A. Morris; David H. Vickrey

[57] ABSTRACT

Disclosed is a flow-through sodium chloride crystallizer comprised of a vertically-oriented crystallizer body having at least two segments of different cross-sectional area, at least two inlets for the introduction of saturated $MgCl_2$ brine at minimum of two distinct vertical locations having different cross-sectional areas along the crystallizer body, at least two inlets for the introduction of a saturated NaCl brine at a minimum of two distinct vertical locations having different cross-sectional areas along the crystallizer body, at least one lower outlet for removal of NaCl crystals and at least one upper outlet for removal of spent brine. Also disclosed is an apparatus for producing hopper-shaped NaCl crystals and/or NaCl crystals of varying, segregated purity, and a process for producing the same.

5 Claims, 2 Drawing Sheets

CRYSTALLIZER, PROCESS AND APPARATUS FOR PRODUCING SODIUM CHLORIDE CRYSTALS

BACKGROUND OF THE INVENTION

This invention is directed to a crystallizer, a process and an apparatus which are particularly suitable for producing high purity sodium chloride.

As discussed in detail in *Sodium Chloride: The Production and Properties of Salt and Brine*, Dale W. Kaufmann, 1971, pages 15-21, sodium chloride crystals are generally in the form of a simple cube without any modifying faces. However, the presence of certain foreign substances in the solution from which salt is crystallizing may cause modifications. Skeleton-type crystals (either octahedrons or combinations of octahedron and cube) may result from rapid crystal growth without the presence of a foreign substance. Further, hopper-shaped cubes can be produced by rapid crystal growth which is parallel to octahedron and dodecahedron faces. By filling out the cube edges and corners, hopper-shaped depressions are formed at the center of each of the cube faces. Such hopper-shaped cubes are particularly preferred where rapid dissolving is desired, such as in some food and seasoning applications and certain agricultural and chemical uses.

High purity is another frequently desired characteristic of sodium chloride. High purity may be desired in combination with rapid dissolution, as in the situations mentioned above, or high purity may be wanted for uses such as water softening.

Historically, high purity sodium chloride is manufactured in heated enclosed evaporators to vaporize solvent water. Production of brine from sodium chloride requires energy, typically obtained from fossil fuels. In order to reduce fossil fuel usage in sodium chloride production, various arrangements of brine heaters and evaporators have been designed and operated. Typical arrangements to enhance efficiency employ multi-effect evaporation and vapor recompression.

Sodium chloride produced in steam heated enclosed vessel evaporators is usually granular in size and cubic in crystal geometry. However, as mentioned above, sodium chloride crystal geometry is not necessarily cubic. For example, the Alberger process and the grainer process produce hopper-shaped crystals by open pan methods. Dentritic salt may be produced in enclosed vessels by introducing foreign substances (crystal habit modifiers) into the contained brine. Flat flakes may be produced by the compression of granular sodium chloride.

Solar vaporization of the aqueous solvent in a brine to produce "solar salt" is an ancient, low-cost alternative to the earlier presented methods of sodium chloride production. In its simplest form, solar salt is produced by exposing aqueous sodium chloride brines to sunlight, evaporating some or all of the aqueous solvent to cause concentration and thus crystallizing dissolved constituents (such as sodium chloride). The major disadvantage of solar salt is the reduced sodium chloride purity when compared to vacuum evaporated sodium chloride.

Another well-known process, sometimes, referred to as the "salting out" process, provides a relatively low energy, low cost method for the production of sodium chloride. In a salting out process, two or more aqueous solutions, each containing a single solute, or more typically, multiple solutes, are combined. When combined, the resulting aqueous mixture contains two or more solutes such that the solubility of one or more of the solutes is exceeded. For example, U.S. Pat. No. 3,832,143 discloses methods for making table-grade sodium chloride by mixing two brines having two distinct magnesium chloride concentrations, but each substantially saturated with respect to sodium chloride, to form a crystal crop of table-grade sodium chloride and a brine depleted in sodium chloride. The saturated brines may be prepared by solar evaporation of initial or starting brines such as ocean brines and Great Salt Lake brines. Specifically, Example II of U.S. Pat. No. 3,832,143 teaches mixing in a reactor crystallizer a first brine containing, among other things, 1.2 wt. percent Mg, 8.0 wt. percent Na and 14.8 wt. percent Cl and a second brine containing, among other things, 7.4 wt. percent Mg, 0.6 wt. percent Na and 20.2 wt. percent Cl. First a slurry, then substantially pure NaCl, are produced. U.S. Pat. No. 3,832,143 also discloses recycle of the depleted brine through the solar evaporation system. It should additionally be noted that U.S. Pat. No. 3,772,202 discloses use of a solar pond to concentrate a bitterns brine which contains NaCl but predominates in magnesium chloride. U.S. Pat. No. 3,852,044 discloses a solar evaporation system which produces sodium crystals, potassium minerals and an aqueous solution concentrated at least near magnesium chloride saturation.

SUMMARY OF THE INVENTION

In one embodiment, the current invention is drawn to a flow-through sodium chloride crystallizer comprised of a vertically oriented crystallizer body having at least two segments of different cross-sectional area, at least two inlets for the introduction of saturated $MgCl_2$ brine at a minimum of two distinct vertical locations having different cross-sectional areas along the crystallizer body, at least two inlets for the introduction of a saturated NaCl brine at a minimum of two distinct vertical locations having different cross-sectional areas along the crystallizer body, at least one lower outlet for removal of NaCl crystals and at least one upper outlet for removal of spent brine.

The current invention also entails an apparatus for the production of a saturated $MgCl_2$ brine and NaCl crystals of varying segregated purity comprising:

(a) at least one flow-through sodium chloride crystallizer comprised of a vertically-oriented crystallizer body having at least two segments of different cross-sectional area, at least two inlets for the introduction of saturated $MgCl_2$ brine at a minimum of two distinct vertical locations having different cross-sectional areas along the crystallizer body, at least two inlets for the introduction of a saturated NaCl brine at a minimum of two distinct vertical locations having different cross-sectional areas along the crystallizer body, at least one lower outlet for removal of NaCl crystals and at least one upper outlet for removal of spent brine;

(b) a spent brine $MgCl_2$ reconcentration system; and (c) means for transporting said spent brine from said upper outlet to said spent brine $MgCl_2$ reconcentration system.

Further, the current invention discloses a process for the preparation of a NaCl crystals of varying, segregated purity comprising:

(a) introducing an upper saturated $MgCl_2$ brine stream into a vertically oriented crystallizer body at an upper segment of said crystallizer body;

(b) introducing a lower saturated $MgCl_2$ brine stream into said crystallizer body at a lower segment of said crystallizer body, said upper segment having a greater cross-sectional area than said lower segment;

(c) introducing an upper saturated NaCl brine stream into said crystallizer body at said upper segment of said crystallizer body;

(d) introducing a lower saturated NaCl brine stream into said crystallizer body at said lower segment of said crystallizer body;

(e) allowing said brine streams introduced in steps (a) through (d) to mix in said crystallizer body to produce NaCl crystals and a spent brine stream;

(f) removing said spent brine stream from the upper portion of said crystallizer body; and (g) removing said NaCl crystals from the lower portion of said crystallizer body.

As used in this Summary of the Invention, "saturated $MgCl_2$ brine" and "saturated NaCl brine" have the definitions provided below.

DESCRIPTION OF THE PREFERRED EMBODIMENTS

As used herein, the following terms have the definitions provided.

The phrase "saturated $MgCl_2$ brine" refers to a substantially saturated brine having $MgCl_2$ as a principal component and may contain lesser amounts of other inorganic components including but not limited to compounds and/or ions of Na, K, Ca, $SO_4$ and Br.

The phrase "saturated NaCl brine" refers to a substantially saturated brine having NaCl as a principal component and may contain lesser amounts of other inorganic components including but not limited to compounds and/or ions of Mg, K, Ca, $SO_4$ and Br.

The sodium chloride crystallizer of the current invention will be described with reference to FIG. 1.

Figure 1:
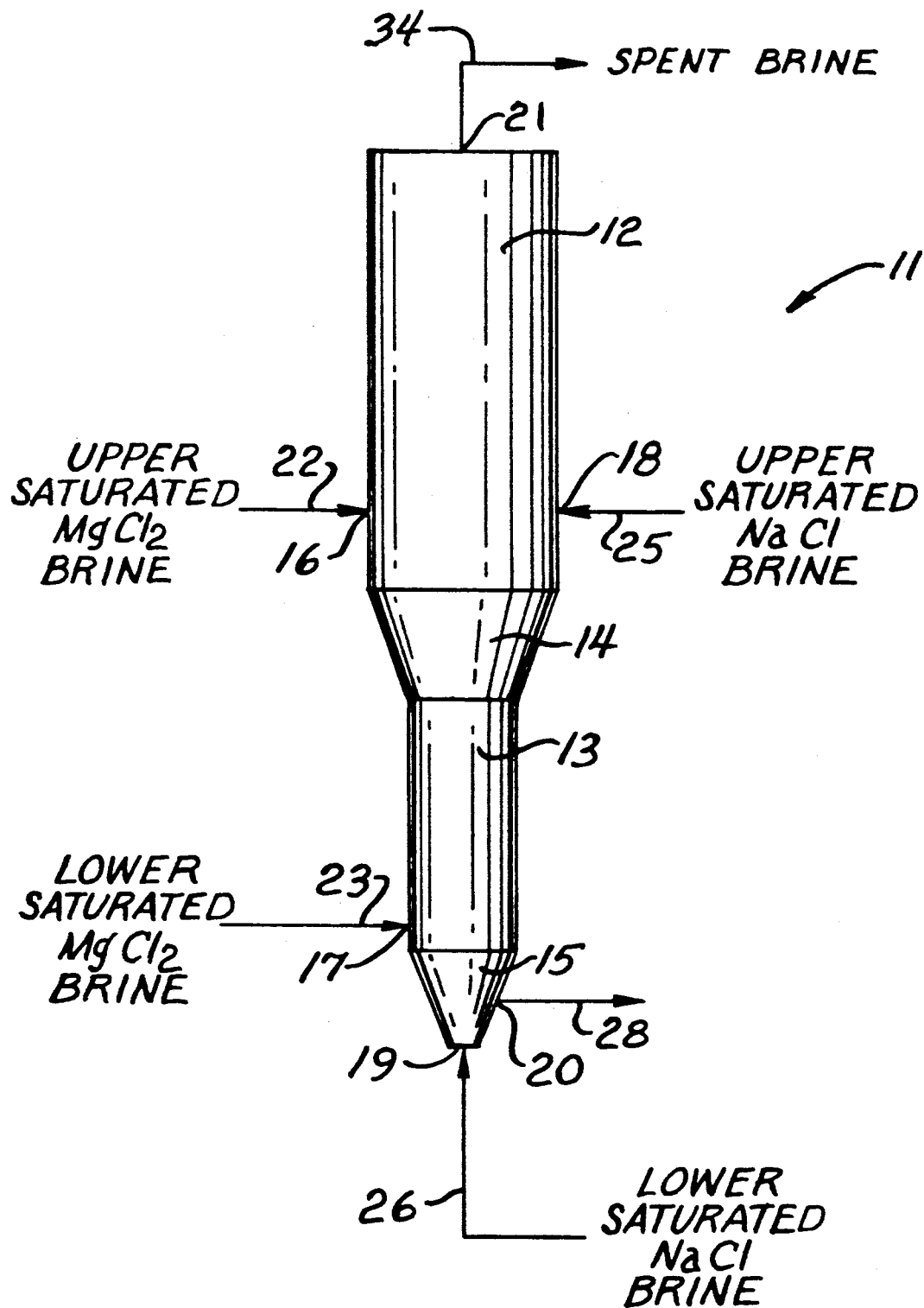
FIG. 1 is a schematic of one embodiment of the flow-through sodium chloride crystallizer of the current invention.

FIG. 1 illustrates schematically the preferred embodiment of the sodium chloride crystallizer. At a minimum, the sodium chloride crystallizer is comprised of a vertically oriented crystallizer body 11 and the various inlets 16 though 19 and outlets 20 and 21 further described below. Crystallizer body 11 is comprised of upper segment 12, lower segment 13 and transition segment 14. Upper segment 12 has a greater cross-sectional area than that of lower segment 13. Although the current invention is not limited to the following specifications, it is typical for the cross-sectional area ratio of upper segment 12 to lower segment 13 to be about 2/1 to about 25/1 and preferably about 3/1 to about 6/1. Transition segment 14 is provided to supply fluid communication between upper segment 12 and lower segment 13. Optionally, crystallizer body 11 may have a second transition segment 15 below lower segment 13.

Upper saturated $MgCl_2$ brine inlet 16 and lower saturated $MgCl_2$ brine inlet 17 are positioned at distinct vertical locations along crystallizer body 11, with the caveat that such locations have different cross-sectional areas. Although in FIG. 1 upper saturated $MgCl_2$ brine inlet 16 is located in upper segment 12 and lower saturated $MgCl_2$ brine inlet 17 is located in lower segment 13, it is possible, for example, to position upper saturated $MgCl_2$ brine inlet 16 in transition segment 14 and lower saturated $MgCl_2$ brine inlet 17 in optional second transition segment 15. Upper saturated $MgCl_2$ brine inlet 16 and lower saturated $MgCl_2$ brine inlet 17 are fed respectively by upper $MgCl_2$ brine conduit 22 and lower $MgCl_2$ brine conduit 23.

Upper saturated NaCl brine inlet 18 and lower saturated NaCl brine inlet 19 are positioned along the crystallizer body 11, with the caveat that such locations have different cross-sectional areas. Although in FIG. 1 upper saturated NaCl brine inlet 18 is located in upper segment 12 and lower saturated NaCl brine inlet 19 is located in optional second transition segment 15, it is possible, for example to position upper saturated NaCl brine inlet 18 in transition segment 14 and lower saturated NaCl brine inlet 19 in lower segment 13. Upper saturated NaCl brine inlet 18 and lower saturated NaCl brine inlet 19 are fed respectively by upper NaCl brine conduit 25 and lower NaCl brine conduit 26. Lower outlet 20 is positioned in either the optional lower transition segment 15 or (particularly if lower transition segment 15 is not present) in lower segment 13.

Lower outlet 20 is provided for the removal of a slurry of high purity (typically greater than 99.80% purity) sodium chloride. Also, a surprisingly high percentage of such sodium chloride will be in the form of hopper-shaped cubes. Conduit 28 is provided for further transport of the slurry. Typically, the sodium chloride slurry is transported to dehydration equipment (such as centrifuges) for removal of water from the slurry. Upper outlet 21 is provided for the removal of spent brine from the sodium chloride crystallizer.

In addition to the components described above, the crystallizer of the current invention may be comprised of additional segments of varying cross-sectional area, additional transition segments and additional inlets and outlets for the $MgCl_2$ brines, NaCl brines, slurries, and crystallized sodium chloride.

Figure 2:
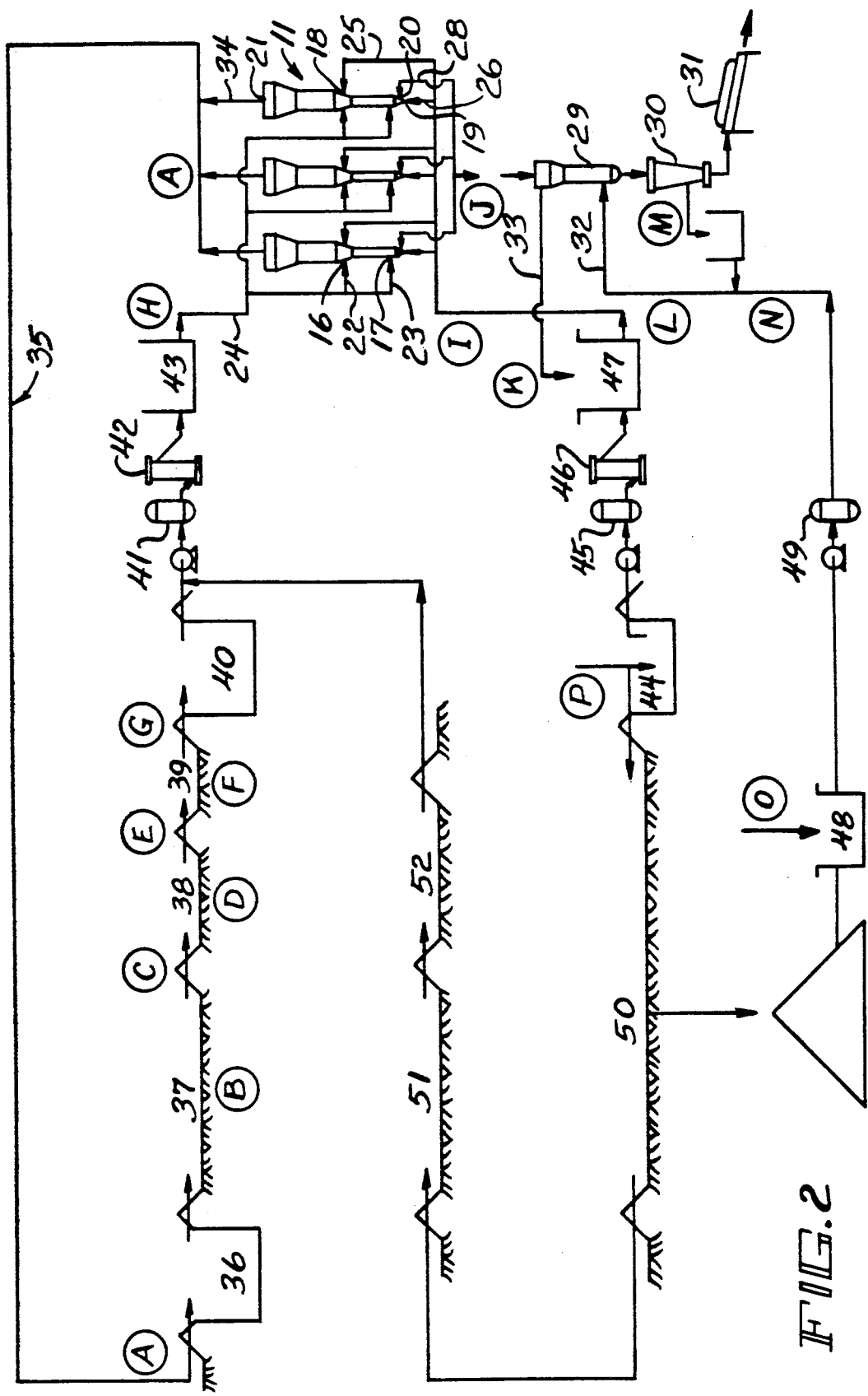
FIG. 2 is a schematic of one embodiment of the apparatus of the current invention for producing NaCl crystals.

The apparatus and process of the current invention may be further described with reference to FIG. 2. The apparatus of the current invention is comprised of one or more sodium chloride crystallizer body 11. Sodium crystallizer body 11 is illustrated in detail at FIG. 1 and described in detail above. Each sodium chloride crystallizer body 11 is fed by at least two saturated $MgCl_2$ brine streams through upper saturated $MgCl_2$ brine inlet 16 and lower saturated $MgCl_2$ brine inlet 17. Inlets 16 and 17 are supplied via upper $MgCl_2$ brine conduit 22 and lower $MgCl_2$ brine conduit 23, respectively. Conduits 22 and 23 may be fed from one saturated $MgCl_2$ brine conduit 24 (as shown in FIG. 2) or from separate saturated $MgCl_2$ brine supply sources.

Each sodium chloride crystallizer body 11 is also fed by at least two saturated NaCl brine streams through upper saturated NaCl brine inlet 18 and lower saturated NaCl brine inlet 19. Inlets 18 and 19 are supplied via upper NaCl brine conduit 25 and lower NaCl brine conduit 26, respectively. Conduits 25 and 26 may be fed from one saturated NaCl brine conduit 27 (as shown in FIG. 2) or from separate saturated NaCl brine supply sources.

A slurry of sodium chloride crystals in brine is removed from crystallizer body 11 via lower outlet 20 and transported via conduit(s) 28 to a system suitable and adapted for removing brine from the sodium chloride crystals. An illustrative brine removal system shown in FIG. 2 is comprised of wash vessel 29, centrifuge 30 and dryer 31. The brine removed from wash vessel 29 and centrifuge 30 may be recycled back to crystallizer body 11 via conduits 32 and 33, and, eventually conduit 27.

Spent brine is removed from crystallizer body 11 via upper outlet 21 and routed for further handling via conduits 34 and 35. The spent brine is preferably reconcentrated in $MgCl_2$ for recycling to crystallizer 11. Many means are available to reconcentrate such streams. Preferably, the spent brine is reconcentrated by a solar evaporation system substantially similar to the one illustrated at FIG. 2 and described below; however, the spent brine may be first removed to holding tank 36 prior to reconcentration. A solar evaporation system requires at least one solar pond. Most preferably, the solar evaporation system of the current application is comprised of first solar evaporation pond 37, second solar evaporation pond 38 and third solar evaporation pond 39. As described in detail in Example 1 below, a three stage system to reconcentrate $MgCl_2$ provides three batches of NaCl segregated by purity. In a preferred embodiment, the NaCl from the first solar pond has an approximately 99.0 to 99.7% purity, the NaCl from the second solar pond has an approximately 98.5% to 99.0% purity and the NaCl from the third solar pond has a purity of less than about 96.0%. Optionally, the solar evaporation system may contain a spent brine holding tank 36 and a reconstituted storage tank 40. Alternatively, it may also be desirable to provide filter 41 and saturator 42 for solids removal and storage tank 43 for holding the reconstituted, filtered saturated $MgCl_2$ brine prior to supply to crystallizer body 11 via conduits 24, 22 and 23.

One method of supplying NaCl saturated brine for supply to crystallizer body 11 is illustrated at FIG. 2. The method involves preparing "pickle brine" (brine which has undergone fractional crystallization in a so-called "lime pond" to remove a preponderance of the contaminant calcium sulfate) then storing it at the proper sodium concentration in NaCl brine tank 44. Additionally, it may be desirable to provide filter 45 and saturator 46 for solids removal and storage tank 47 to hold the filtered sodium saturated brine prior to supply to crystallizer 11 via conduits 27, 26 and 25.

As demonstrated by the examples and data which follow, the crystallizer, apparatus and process of the current disclosure produce high purity NaCl crystals. Additionally, a surprisingly high percentage of high purity NaCl crystals produced by the crystallizer, apparatus and/or process of the current invention are hopper-shaped cubes.

EXAMPLE 1

Process Material Balance

The process of the current invention is demonstrated by the material balance described in this Example 1. It is understood that this material balance is only an exemplary process within the scope of the current invention. It is intended only as one working example of the current invention. Neither this Example 1 nor the following examples are intended to limit the scope of this invention.

This Example 1 is discussed with reference to FIGS. 1 and 2 and Table 1.

This material balance was based on a daily production of 500 tons hopper-shaped NaCl as output (through one or more conduit(s) 28) from one or more crystallizer body 11. The composition of the NaCl product stream J (in slurry form) is detailed in Table 1. Approximately 50 to 80% of the NaCl crystals are hopper-shaped cubes. The hopper-shaped NaCl product may be further treated in wash vessel 29, centrifuge 30 and dryer 31 to produce dried, purified hopper-shaped salt granules.

In operation a substantially saturated NaCl brine (1020 gpm) of composition I is introduced into one or more crystallizer body 11 via conduits 25 and 26 to mix with a substantially saturated $MgCl_2$ brine (870 gpm) of composition H which is introduced into crystallizer body 11 via conduits 22 and 23. The spent brine of composition A is removed via conduit 34 and transported via conduit 35. Most desirably the spent brine is reconstituted and recycled to the one or more crystallizer body 11. Any reconstitution means which will provide an appropriate saturated $MgCl_2$ brine for the crystallizer body 11 is acceptable in the current process. However, a solar evaporation system is employed for this Example 1.

In operation of the solar evaporation system, spent brine may be transported directly to first solar pond 37. Alternatively, the spent brine may be sent to spent brine holding tank 36 prior to introduction into first solar pond 37. First solar pond 37 is of sufficient size to allow concentration of the brine to composition C. First solar pond 37 produces approximately 146,842 tons per year of about 99.6% purity cubic NaCl having composition B, a brine of composition C and about 155 million gallons per year water of evaporation. Brine of composition C is further concentrated, which is accomplished in this example by use of secondary solar pond 38 and tertiary solar pond 39. The brine of composition C is transferred to secondary solar pond 38 having dimensions to produce a brine of composition E. Secondary solar pond 38 produces 108,216 tons per year of about 99.5% purity cubic NaCl having composition D, a brine of composition E and about 101 million gallons per year water of evaporation. The brine of composition E is transferred to tertiary solar pond 39 having dimensions to produce a brine composition G. Tertiary solar pond 39 produces 45,360 tons per year of mixed salts having composition F, a brine of composition G and about 25 million gallons per year water of evaporation. The mixed salts are predominantly chloride and sulfate salts of sodium, potassium and magnesium. They may be discarded or treated for further recovery of the salts. The brine of composition G is typically sent to reconstituted storage tank 40 prior to treatment in filter 41 and saturator 42, then holding in storage tank 43 prior to use in crystallizer body 11. It should be noted that in addition to producing a saturated $MgCl_2$ brine stream, the tertiary solar evaporation system of this Example produces NaCl of size and shape equivalent to that produced by conventional solar evaporation but segregated into three distinct purities.

In its preferred embodiment, the saturated NaCl brine stream I is prepared by producing a so-called "pickle" brine in a "lime pond" (not shown) to remove the impurity calcium sulfate from the brine by fractional crystallization. The pickle brine of composition P may be stored in NaCl brine tank 44, treated in filter 45 and saturator 46, then stored in storage tank 47. The brine transferred from saturator 46 to storage tank 47 may have the composition I or it may have a composition so that when mixed with composition K in storage tank 47 the output of storage tank 47 will have the composition I.

In order to produce "make-up" saturated $MgCl_2$ brine of concentrations to replenish the recycled saturated $MgCl_2$ brine for feed to crystallizer body 11, a portion of the "pickle brine" of composition P may be treated by solar evaporation processes similar to the evaporation process of solar ponds 37, 38 and 39. The portion of "pickle brine" is treated seriatum in solar ponds 50, 51 and 52 to produce brines of composition Q, R and S. Additionally, approximately 210,600 tons per year of "conventional" solar salt is produced from solar pond 50. A portion of the "conventional" solar salt crop (approximately 31,200 tons per year) may be dissolved in tank 48 to produce a substantially saturated NaCl solution of Composition N. Brine filter 49 may be used to remove suspended particulate contaminants. Brine of composition N may be mixed with brine of composition M removed from centrifuge 30 to provide co-mingled brine of composition L. This co-mingled brine may be used to wash the salt produced in crystallizer body 11 free of adhering mother liquor to produce a washed, purified NaCl of purity greater than 99.8%.

TABLE 1

Description of Flowstreams of the Material Balance of Example 1

| Flow-stream | Composition (% By Weight) | | | | | | | Flowrate (tons/yr.) |
|---|---|---|---|---|---|---|---|---|
| | $Mg^{+2}$ | $Na^+$ | $K^+$ | $Ca^{+2}$ | $Cl^{-1}$ | $SO_4^{-2}$ | $H_2O$ | |
| A | 4.56 | 3.18 | 0.69 | | 16.74 | 3.03 | 71.76 | 3,821,810 |
| B | .06 | 39.14 | .05 | 0.06 | 60.53 | 0.16 | | 155,880 |
| C | 5.76 | 1.93 | 1.57 | | 18.10 | 3.66 | 68.98 | 2,888,496 |
| D | 0.11 | 39.09 | 0.08 | 0.08 | 60.38 | 0.26 | | 112,392 |
| E | 6.94 | 1.08 | 1.48 | | 19.60 | 4.35 | 66.55 | 2,247,192 |
| F | 0.08 | 39.03 | 0.06 | 0.10 | 60.43 | 0.30 | | 99,648 |
| G | 7.50 | 0.64 | 0.87 | | 21.00 | 3.72 | 66.27 | 1,995,840 |
| H | 7.50 | 0.68 | 0.77 | | 21.04 | 3.84 | 66.17 | 287.136* |
| I | 1.02 | 8.75 | 0.56 | | 15.56 | 1.90 | 72.21 | 306.662* |
| J | 1.05 | 8.73 | 0.49 | | 15.70 | 1.71 | 72.31 | 42.155* |
| K | 0.01 | 9.20 | 0.36 | | 15.85 | 1.24 | 72.58 | 57.138* |
| L | NOT DETERMINED | | | | | | | |
| M | NOT DETERMINED | | | | | | | |
| N | 0.01 | 10.51 | 0.01 | 0.01 | 16.23 | 0.01 | 73.22 | 15.43* |
| O | | 0.02 | | 0.01 | 0.03 | | 99.94 | 11.102* |
| P | 1.08 | 8.65 | 0.60 | | 15.50 | 2.05 | 72.12 | 1,796,400 |
| Q | 1.50 | 7.40 | 0.80 | | 15.10 | 3.00 | 72.20 | |
| R | 3.50 | 5.50 | 2.20 | | 14.20 | 6.70 | 67.66 | |
| S | 7.50 | 0.50 | 0.80 | | 20.50 | 3.80 | 66.90 | 71,539 |

*Indicates "tons/hr." rather than "tons/yr."

TABLE 2

| Crystallizer Operating Data | | | |
|---|---|---|---|
| | A | B | C |
| Run Length (Hours) | 5.0 | 3.5 | 15.0 |
| Upper Saturated $MgCl_2$ Brine (gpm) | 0.055 | 0.033 | 0.067 |
| Lower Saturated $MgCl_2$ Brine (gpm) | 0.040 | 0.034 | 0.023 |
| Upper Saturated NaCl Brine (gpm) | 0.055 | 0.033 | 0.073 |
| Lower Saturated NaCl Brine (gpm) | 0.058 | 0.034 | 0.027 |
| $Mg^{++}$ Conc. in Saturated $MgCl_2$ Brine (wt. %) | 7.0 | 7.0 | 7.5 |
| $Na^+$ Conc. in Saturated NaCl Brine (wt. %) | 9.0 | 9.0 | 9.0 |
| Specified Velocity in Upper Segment 12 (in/sec) | 0.25 | 0.16 | 0.23 |
| Specified Velocity in Lower Segment 13 (in/sec) | 0.48 | 0.33 | 0.25 |
| Total Lower Feed (gpm) | 0.10 | 0.07 | 0.05 |
| Total Upper Feed (gpm) | 0.11 | 0.07 | 0.14 |

Runs A–C were conducted at ambient temperature and pressure. The NaCl product from Runs A–C, as determined by microscopic evaluation was approximately 75 wt. % hopper-shaped cubes and 25 wt. % simple cubes.

EXAMPLE 3

EXAMPLE 2

Crystallizer of the Current Invention

A crystallizer similar to that illustrated in FIG. 1 was employed. With reference to FIG. 1, the crystallizer body had the following dimensions.

| Upper Segment 12 | 27" long × 2" I.D. |
|---|---|
| Lower Segment 13 | 44" long × 1" I.D. |
| Transition Segment 14 | 2.75" long × 2" I.D. × 1" I.D. |
| Second Transition Segment 15 | 1.75" long × 1" I.D. × 0.375" I.D. |

The saturated $MgCl_2$ brine streams and the saturated NaCl brine streams were introduced at locations as illustrated in FIG. 1. The operating data are provided at Table 2 for these separate runs through the above-described crystallizer.

Comparative Example of the Salting Out Process

This Example 3 demonstrates a "salting out" process generally of the type described in U.S. Pat. No. 3,822,143. A funnel-shaped vertical reactor was employed. From top to bottom, the reactor comprised a 6.0" long × 18.0" I.D. top section, a 12" long × 18.0" I.D. × 3.25" I.D. transition section and a 24" long × 3.25 elutrating leg. Substantially saturated $MgCl_2$ brine and substantially saturated NaCl were simultaneously fed through separate inputs into the base of the vertical reactor. The mixed brine was then circulated from the top of the reactor into the bottom of the elutrating leg. The time of the runs varied between 4 to 12 hours. The saturated $MgCl_2$ brine input and the saturated NaCl input were each fed to the reactor at a rate of 0.066 gpm. The total flowrate to the reactor varied between 2.13 and 3.13 gpm. The circulation flowrate to the elutrating leg varied between 2.14 and 3.0 gpm. The NaCl product produced this salting out process as determined by microscopic evaluation was approximately 40 wt. % simple cubes, 60 wt. % agglomerated cubes and essentially no hopper-shaped cubes.

I claim:

1. A flow-through sodium chloride crystallizer comprised of a vertically oriented crystallizer body having at least two segments of different cross-sectional area, at least two inlets for the introduction of saturated $MgCl_2$ brine at a minimum of two distinct vertical locations having different cross-sectional areas along the crystallizer body, at least two inlets for the introduction of a saturated NaCl brine at a minimum of two distinct vertical locations having different cross-sectional areas along the crystallizer body, at least one lower outlet for removal of NaCl crystals and at least one upper outlet for removal of spent brine.

2. An apparatus for the production of a saturated $MgCl_2$ brine and NaCl crystals of varying, segregated purity comprising:

(a) at least one flow-through sodium chloride crystallizer comprised of a vertically-oriented crystallizer body having at least two segments of different cross-sectional area, at least two inlets for the introduction of saturated $MgCl_2$ brine at a minimum of two distinct vertical locations having different cross-sectional areas along the crystallizer body, at least two inlets for the introduction of a saturated NaCl brine at a minimum of two distinct vertical locations having different cross-sectional areas along the crystallizer body, at least one lower outlet for removal of NaCl crystals and at least one upper outlet for removal of spent brine;

(b) a spent brine $MgCl_2$ reconcentration system; and (c) means for transporting said spent brine from said upper outlet to said spent brine $MgCl_2$ reconcentration system.

3. The apparatus of claim 2 wherein said spent brine $MgCl_2$ reconcentration system is comprised of a first solar pond adapted for receipt of spent brine from said upper outlet.

4. The apparatus of claim 3 wherein said spent brine $MgCl_2$ reconcentration system is further comprised of a second solar pond and means for transporting brine from said first solar pond to said second solar pond.

5. The apparatus of claim 4 wherein in said spent brine $MgCl_2$ reconcentration system is further comprised of a third solar pond and means for transporting brine from said second solar pond to said third solar pond.

* * * * *